United States Patent
Roys (10) Patent No.: US 9,664,296 B2
(45) Date of Patent: May 30, 2017

(54) CHECK VALVE (71) Applicant: Curtis Roys, Kingsland, TX (US)

(72) Inventor: Curtis Roys, Kingsland, TX (US)

(*) Notice: Subject to any disclaimer, the term of this patent is extended or adjusted under 35 U.S.C. 154(b) by 0 days.

(21) Appl. No.: 14/146,713

(22) Filed: Jan. 2, 2014

(65) Prior Publication Data

US 2016/0040795 A1 Feb. 11, 2016

(51) Int. Cl.
*F16T 1/34* (2006.01)
*F16K 5/00* (2006.01)
*F16K 15/04* (2006.01)
*F04B 53/10* (2006.01)
*F04B 53/18* (2006.01)
*F16K 27/02* (2006.01)

(52) U.S. Cl.
CPC ............ *F16K 15/044* (2013.01); *F04B 53/10* (2013.01); *F04B 53/18* (2013.01); *F16K 27/0245* (2013.01)

(58) Field of Classification Search
CPC .......... F16T 1/00–1/48; F16K 99/0023; F16K 21/08; F16K 17/0406; F16K 15/183; F16K 15/044; F16K 15/042; F16K 15/04; F16K 1/443; F16K 1/446; F16K 27/0245; F04D 29/063; F16N 13/10; F16N 23/00; Y10T 137/3021; Y10T 137/3024; Y10T 137/304; Y10T 137/3043; Y10T 137/4456; Y10T 137/4463; Y10T 137/4471; Y10T 137/4478; Y10T 137/4486; Y10T 137/4501; Y10T 137/4508; Y10T 137/5109; Y10T 137/87917; Y10T 137/878; Y10T 137/87845; Y10T 137/87861; Y10T 137/7838; Y10T 137/791; Y10T 137/7911; Y10T 137/7912; F04B 53/10; F04B 53/18

USPC ............ 137/177, 178, 183, 184, 247, 247.11, 137/247.13, 247.15, 247.17, 247.21, 137/247.23, 269, 878, 879, 881, 613, 512, 137/533.11, 533.13, 533.15; 251/127
See application file for complete search history.

(56) References Cited

U.S. PATENT DOCUMENTS

| 942,995 | A | * | 12/1909 | Bargar | 137/613 |
|---|---|---|---|---|---|
| 1,002,463 | A | * | 9/1911 | Spellmeyer | 137/613 |
| 1,112,631 | A | * | 10/1914 | Longtin | 137/878 |
| 1,234,878 | A | * | 7/1917 | Corvin | 137/512 |
| 1,343,677 | A | * | 6/1920 | Langmack | 184/27.2 |
| 1,512,597 | A | * | 10/1924 | Harmon | 137/512 |
| 1,734,292 | A | * | 11/1929 | Gonzalez | 137/512 |
| 1,946,339 | A | * | 2/1934 | Vigers et al. | 137/247.21 |
| 2,306,012 | A | * | 12/1942 | Campbell | 137/512 |
| 2,554,481 | A | * | 5/1951 | Sheen | F04B 53/1005 137/512 |
| 2,724,555 | A | * | 11/1955 | Roetter | 137/625.27 |
| 2,809,659 | A | * | 10/1957 | Gillespie et al. | 137/512 |

(Continued)

*Primary Examiner* — Craig J Price (74) *Attorney, Agent, or Firm* — Scheinberg & Associates, P.C.; Michael O. Scheinberg; John B. Kelly (57) ABSTRACT

A check valve includes an internal liquid trap that prevents the backflow of gas and debris from degrading the valve. The internal liquid trap can be formed by internal passages within a valve housing. One embodiment includes three internal passages, an inlet passage, an intermediate passage, and an outlet passage, with connecting passages between each of the inlet passage and outlet package, and the intermediate package. In some embodiments, an internal trap is provided between the intermediate passage and the inlet passage.

14 Claims, 13 Drawing Sheets

(56) References Cited

U.S. PATENT DOCUMENTS

| | | | | |
|---|---|---|---|---|
| 3,292,498 | A * | 12/1966 | Zimmerman | F01L 25/06 91/308 |
| 3,371,745 | A * | 3/1968 | Callahan | F16N 25/02 184/7.4 |
| 3,409,104 | A * | 11/1968 | Acker | F16N 25/02 184/7.4 |
| 3,491,788 | A * | 1/1970 | Kilayko | 137/512 |
| 3,491,795 | A * | 1/1970 | Jennings et al. | 137/863 |
| 4,862,911 | A * | 9/1989 | Yie | F04B 53/109 137/454.4 |
| 5,520,523 | A * | 5/1996 | Yorita | F04B 43/067 417/387 |
| 5,662,023 | A * | 9/1997 | Carson et al. | 184/7.4 |
| 5,698,117 | A * | 12/1997 | Doutt | B23K 11/3054 137/488 |
| 6,247,487 | B1 * | 6/2001 | Skill | 137/199 |
| 6,467,854 | B2 * | 10/2002 | Frank | B60T 8/323 137/596.17 |
| 7,806,142 | B2 * | 10/2010 | Baros et al. | 137/614.2 |
| 7,905,557 | B2 * | 3/2011 | Frank et al. | 137/613 |
| 8,555,927 | B2 * | 10/2013 | Roys | 137/884 |
| 8,622,082 | B1 * | 1/2014 | Roys | 137/513 |
| 8,770,543 | B2 * | 7/2014 | Huynh | 91/445 |
| 8,807,170 | B2 * | 8/2014 | Klaphake et al. | 137/884 |
| 8,899,279 | B2 * | 12/2014 | Safronovs | 141/198 |
| 8,939,176 | B2 * | 1/2015 | Klaphake et al. | 137/884 |
| 2003/0111115 | A1 * | 6/2003 | Schultz et al. | 137/493.9 |
| 2005/0115614 | A1 * | 6/2005 | Einhaus | 137/512 |
| 2014/0000983 | A1 * | 1/2014 | Roys | 184/14 |

\* cited by examiner

CHECK VALVE

TECHNICAL FIELD OF THE INVENTION

The present invention relates to extending the life of check valves in hostile environments, and is particularly suitable for use in lubrication systems for natural gas compressors.

BACKGROUND OF THE INVENTION

Natural gas compressors require a consistent supply of lubricant. To enter the compressor, the lubricant must be delivered at a pressure that is greater than the pressure within the compressor. Lubricant is typically distributed to the lubrication points by a divider block, which periodically delivers a small amount of lubricant at a high pressure to each lubrication point. A check valve is used to prevent hot gases from the compressor cylinder from flowing into the lubrication system when the pressure from the lubrication system is reduced, such as between cycles of the divider block. When the lubricant pressure is sufficiently high, the check valve opens and lubricant is injected into the compressor cylinder. When the lubricant pressure is reduced, the spring closes the valve to prevent gases from the compressor cylinder from entering the lubrication system.

Prior art check valves fail due to hot gas and debris entering the check valve each time the pump causes it to open to allow lubricant to be injected into the compressor cylinder or rod packing gland. This exposes the seating surfaces to the hot gas and debris that are in the gas stream of the compressor. The hot gas heats the sealing surfaces in the check valve causing it to fail prematurely. The debris in the gas stream migrates into the check valve and causes the balls to stick open. As the debris lodges between the sealing surface and the ball, the hot gas migrates upstream into the lubricant tubing and causes problems with the pistons that inject oil into the cylinder or rod packing gland.

One known solution is a separate device, a check valve protector, installed on the downstream side of the check valve to protect the sealing surfaces. This adds extra cost to the components and adds another lubricant leak path to the system. Another disadvantage of current check valve protectors is the positioning of the lubricant inlet. The inlet is oriented at a 90 degree position from the check valve protector axis, which prevents the check valve protector from being installed in many applications where the cylinder is close to another cylinder. Another problem with prior art check valve protectors is they incorporate a single NPT thread on the outlet. This causes installation issues when installing the device. Due to the 90 degree inlet of this device, in many cases it must be over torqued to position it correctly to align with the system tubing connection. This causes extreme stress on the threads in the compressor cylinder and has been known to destroy both the cylinder threads and the threads on the device. The over torquing of the threads deforms the metal and not only causes issues with leaking explosive gases to the atmosphere, but also eliminates the ability to reuse that particular injection point if a new device has to be installed. When this occurs the compressor cylinder must be removed and sent to a machine shop to be repaired or a new cylinder must be installed, which costs the owner/operator thousands of dollars.

SUMMARY OF THE INVENTION

An object of the invention is to provide a more reliable check valve.

A check valve includes an internal fluid trap that prevents gas from the output path from passing through the check valve and degrading the sealing surfaces. When used with a natural gas compressor lubrication system, the internal fluid trap prevents hot gases and debris from the compressor interior from degrading the sealing surface within the check valve. Some embodiments include more than one fluid reservoir.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

A preferred check valve includes an internal liquid trap between the sealing components and the outlet to prevent backflow from the outlet from deteriorating the sealing components. In a natural compressor lubrication system, a preferred check valve includes an internal oil trap between the sealing components and the outlet to prevent backflow of hot gases and debris from the compressor. In the description below, the terms "top" and "bottom" are used in relation to the figures.

Figure 1:
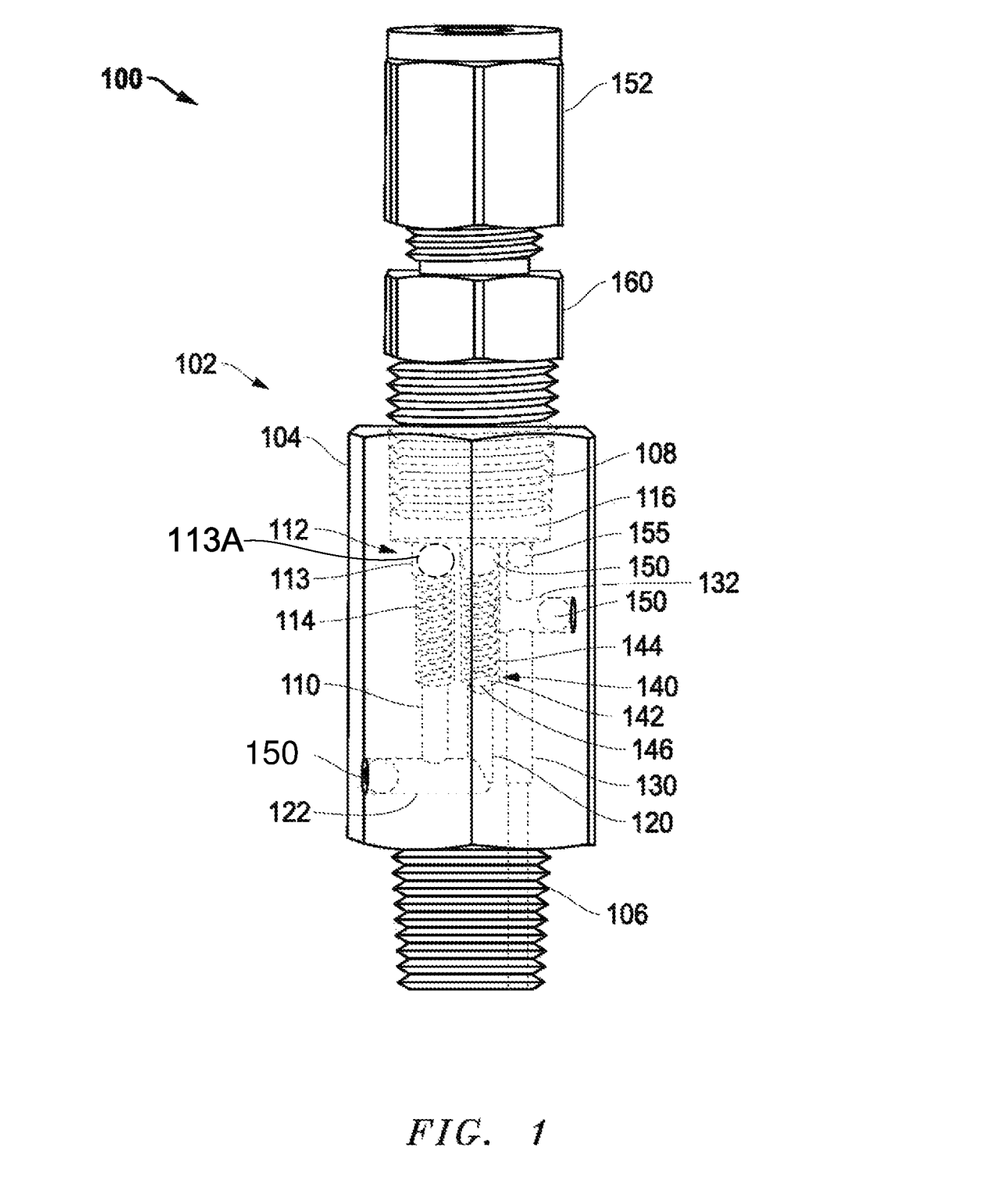
FIG. 1 shows an embodiment of a valve of the invention, with the housing shown as transparent so that the internal components are visible.

FIG. 1 shows an embodiment of a check valve assembly 100 of the present invention. Check valve assembly 100 includes check valve 102 having a body 104 including a first end 106 having male threads for mating with the lubricated equipment and a second end 108 having female threads to mate with a lubrication source or adapter. Within the body 104 are three primary passages and two connecting passages. Inlet passage 110 includes an inlet valve 112, which includes a ball seat 113 into which a ball (shown in phantom at 113a) is biased by a spring 114 to seal an opening between a cavity 116 at second end 108 and inlet passage 110. An intermediate passage 120 is connected to inlet passage 110 by a first connecting passage 122. Outlet passage 130 extends through first end 106 of the valve body to deliver lubricant to the lubricated equipment. A second connecting passage 132 connects the intermediate passage 120 with the outlet passage 130. A valve 140 in the second passage includes a ball 142 and a spring 144 that presses the ball 142 into a seat 146 to seal the intermediate passage. When lubricant under pressure enters the valve 102 from first end 108, it displaces the ball 113a in inlet passage 110 from ball seat 113 by counteracting the pressure of spring 114. The lubricant flows through inlet passage 110, through connecting passage 122 and up intermediate passage 120. The lubricant under pressure displaces ball 142 by counteracting the pressure of spring 144 and flows through valve 140 into second connecting passage 132 into outlet passage 130. From outlet passage 132, the lubricant flows out of the valve 102 and into the lubricated equipment.

When the lubricant pressure is reduced below the pressure required to open valves 112 and 140, the lubricant will cease to flow, leaving lubricant trapped in inlet passage 110, first connecting passage 122, and portions of intermediate passage 120 above valve 140. The trapped lubricant protects valves 112 and 140 by preventing hot gases and debris from the lubricated equipment from reaching the valves. The trapped lubricant also prevents gases and debris from passing through valve 102 and entering the lubrication system.

Adapter 160 mates with pipe thread in second end 108 and provides threads for receiving a standard tube fitting 152. Because the axis of the inlet threads at second end 108 and the axis of the outlet threads on first end 106 are parallel, there is no requirement to rotate valve 102 until it is at an orientation to accommodate the lubricant supply tubing. The valve 102 can therefore be installed at a desired torque into the lubricated equipment, and then adapter 160 can also be installed at the proper torque into the threads at second end 108. The use of a tube fitting 152 facilitates connecting and disconnecting lubricant supply tubing (not shown). The use of adapter 160 eliminates the error of a user installing an incorrect adapter, such as one having NPS (National Pipe Straight) threads instead of NPT (National Pipe Tapered) threads of the same pitch and diameter.

Figure 2:
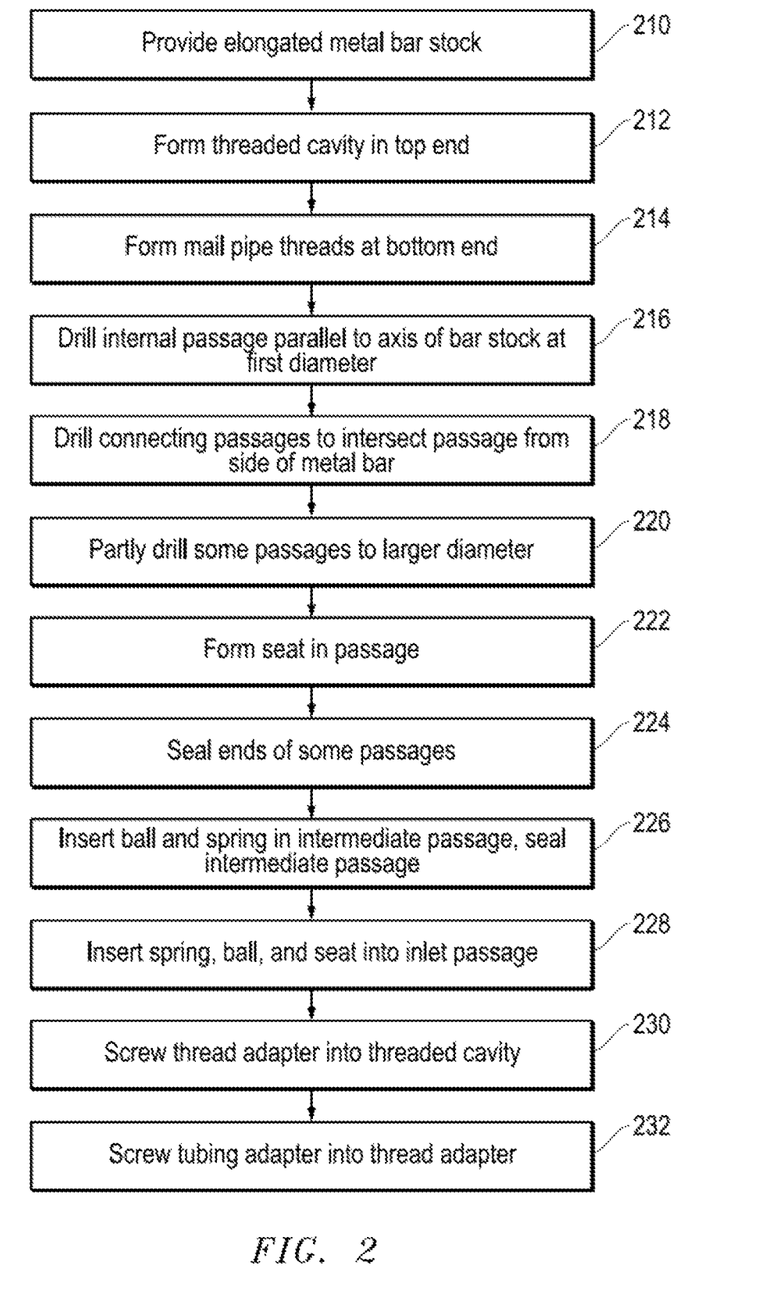
FIG. 2 is a flow chart showing the steps of fabricating one embodiment of the invention.
Figure 15:
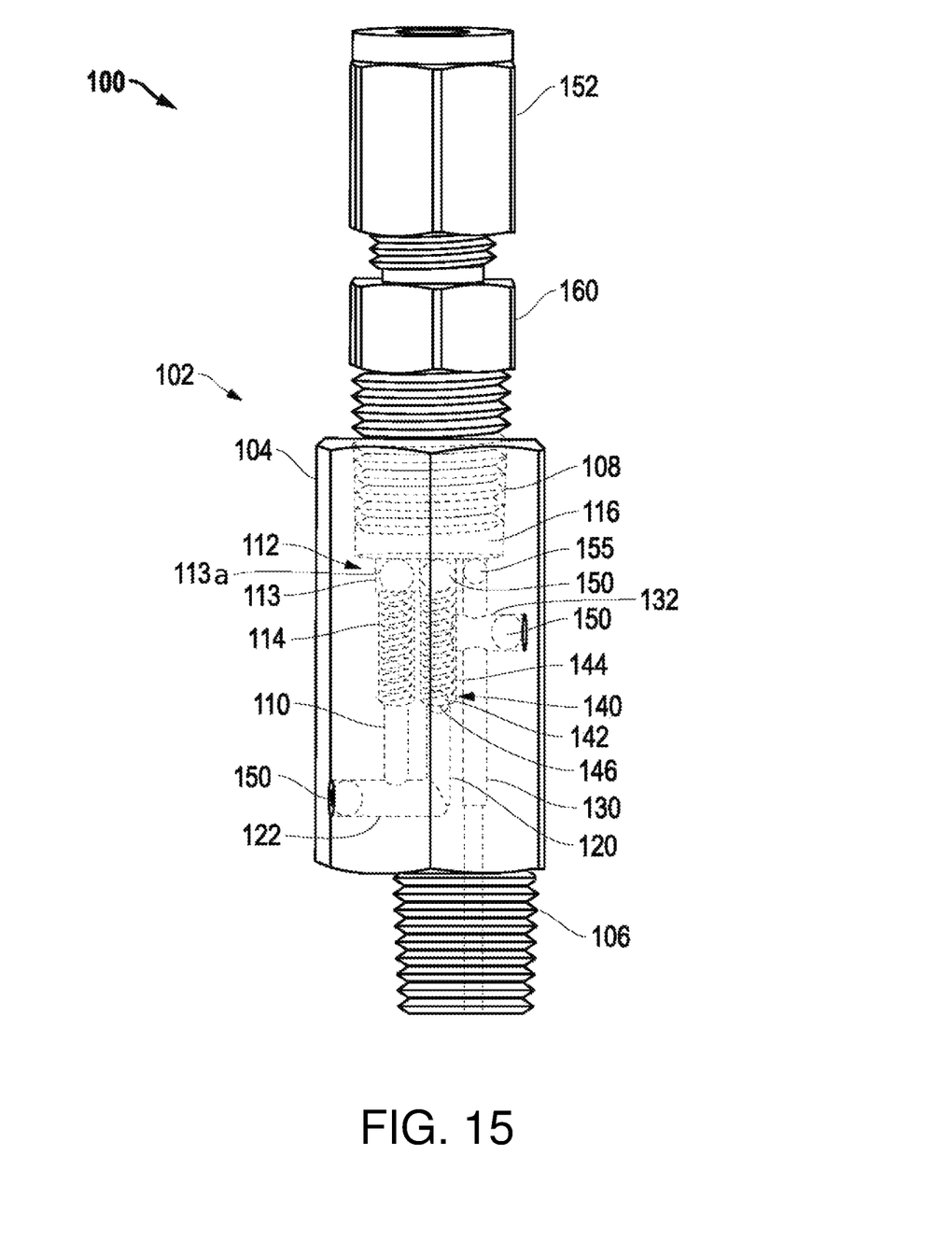
FIG. 15 shows an alternative embodiment of a valve of the invention, with the housing shown as transparent so that the internal components are visible.

Skilled persons can readily determine how to construct a valve embodying the invention. FIG. 2 and the description below describe one method of fabricating a valve, but many other methods can readily be determined. Valve body 104 can be constructed from a solid piece of metal, such as stainless steel. The material chosen will depend on the application, but for use in a natural gas compressor lubrication system, the material should be resistant to corrosion by the gases and debris in the compressor. In step 210, a hexagonal bar of metal is provided. In step 212, cavity 116 is drilled in one end of the bar stick and female pipe threads are cut in the cavity to accept an inlet fitting. In step 214, the opposite end of the bar stick is milled and threaded or turned on a lathe to produce male pipe threads at first end 106. The central axis of male end 106 is parallel to the longitudinal axis of the bar stock, but offset to provide enough material around exit passage 106 for mechanical support. An embodiment having an offset is shown in FIG. 15. The relative position of inlet passage 110, intermediate passage 120, and exit passage 130 within the body 104 can be different for different embodiments. In some embodiments, the central axis of male end 106 is not offset from the longitudinal axis of the bar stock, and the male threads at first end 106 are co-axial with the female threads on second end 108. A coaxial embodiment lacking an offset is shown in FIG. 1.

In step 216, passages 110, 120 and 130 are partly formed by drilling from the cavity 166 using a drill having a first diameter. Outlet passage 130 can be drilled part way from the top and part of from the bottom. If passage 130 is drilled partly from the bottom, the diameter of the upper and lower portions of the passage need not be the same. In some embodiments, the diameter at the bottom is smaller. In step 218, connecting passages 122 and 132 are drilled from the sides of the metal bar.

In step 220, the top parts of inlet passage 110 and intermediate passage 120 are drilled to a larger diameter. In step 222, a seat is formed where the diameter changes in intermediate passage 120. In step 224, the top portion of outlet passage 130 and the outside of connecting passages 122 and 132 are plugged with a plug 150 (FIG. 1) to seal them. In step 226, a ball that mates with seat 146 is inserted into intermediate passage 120. Spring 144 is inserted and the top of intermediate passage 120 is sealed with a plug. In step 228, spring 114 is inserted into inlet passage 110. A ball 113a is placed on spring 114, and a valve seat is inserted into the top of the inlet passage. For example, the valve seat can be screwed into the top of the passage or can be press fit. The valve 102 is now assembled and ready for operation. In step 230, an adapter is screwed into the second end 108.

FIGS. 3-14 show another embodiment of a check valve of the present invention. In this embodiment, the threads on each end are co-axial, and the outlet passage is centered in the tube body. The inlet passage and the intermediate passage are shorter than those in the embodiment of FIG. 1, allowing a more compact design and reducing the amount of liquid required to fill the passages, thereby expediting passage of the liquid to the outlet when the valve is first installed. Check valve 302 includes a body 304 including a first end 306 having male threads for mating with the lubricated equipment and a second end 308 having female threads to mate with a lubrication source or adapter. Within the body 304 are three primary passages and two connecting passages. Inlet passage 310 includes an inlet valve 312, which includes a ball seat 313 into which a ball 309 is biased by a spring 314 to seal an opening between a cavity 316 at second end 308 and inlet passage 310. An intermediate passage 320 is connected to inlet passage 310 by a first connecting passage 322. Outlet passage 330 extends through first end 306 of the valve body to deliver lubricant to the lubricated equipment. A second connecting passage 332 connects the intermediate passage 320 with the outlet passage 330. A valve 340 in the second passage includes a ball 342 and a spring 344 that presses the ball 342 into a seat 346 to seal the intermediate passage. When lubricant under pressure enters the valve 302 from first end 308, it displaces the ball in inlet passage 310 from ball seat 313 by counteracting the pressure of spring 314. The lubricant flows through inlet passage 310, through connecting passage 322 and up intermediate passage 320. The lubricant under pressure displaces ball 342 by counteracting the pressure of spring 344 and flows through valve 340 into second connecting passage 332 into outlet passage 330. From outlet passage 332, the lubricant flows out of the valve 302 and into the lubricated equipment.

Figure 3:
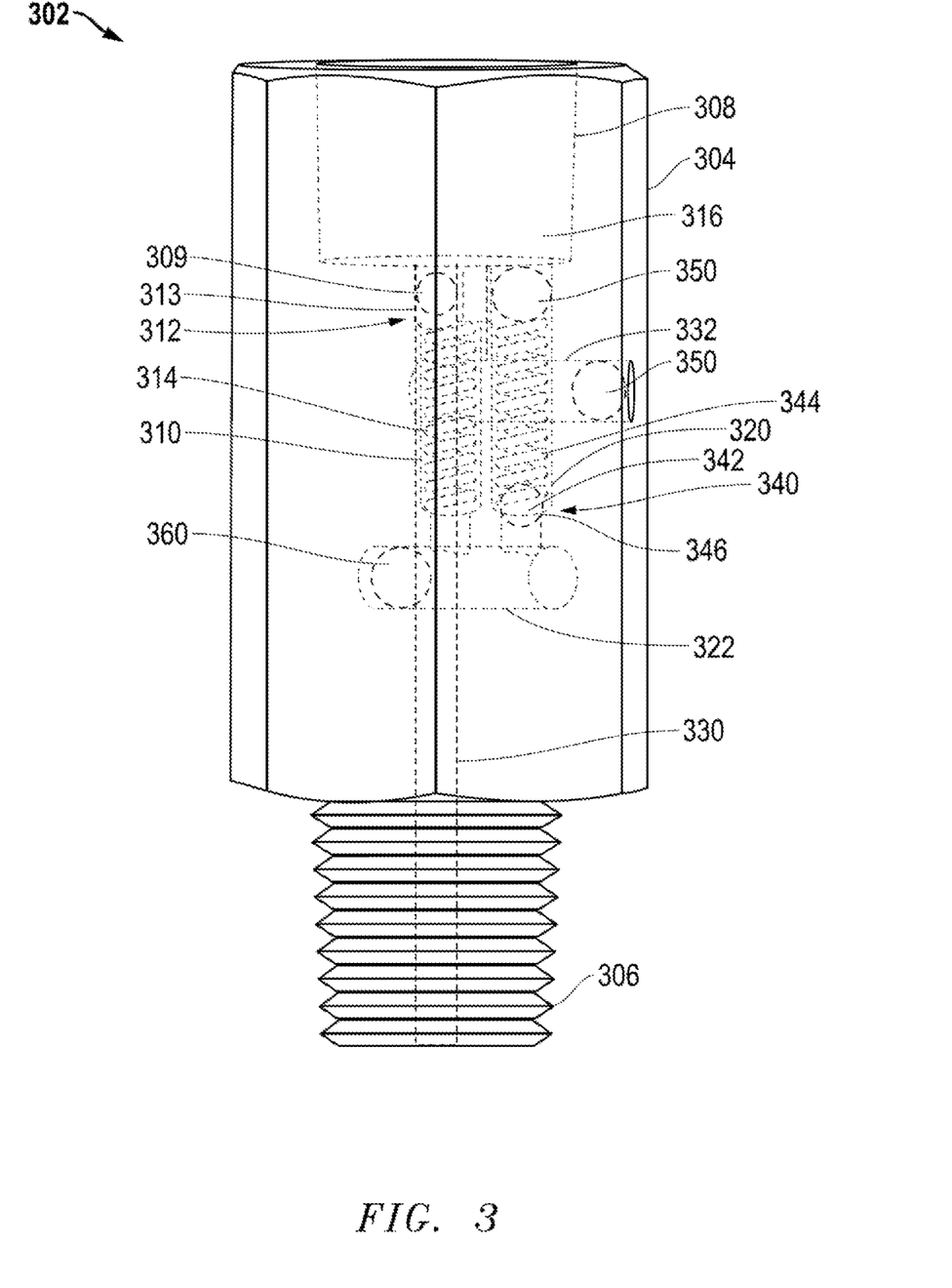
FIG. 3 shows another embodiment of a valve of the invention, with the housing shown as transparent so that the internal components are visible.

When the lubricant pressure is reduced below the pressure required to open valves 312 and 340, the lubricant will cease to flow, leaving lubricant trapped in inlet channel 310, first connecting channel 322, and portions of intermediate channel 320 above valve 340. The trapped lubricant protects valves 312 and 340 by preventing hot gases and debris from the lubricated equipment from reaching the valves. The trapped lubricant also prevents gases and debris from passing through valve 302 and entering the lubrication system.

Figure 4:
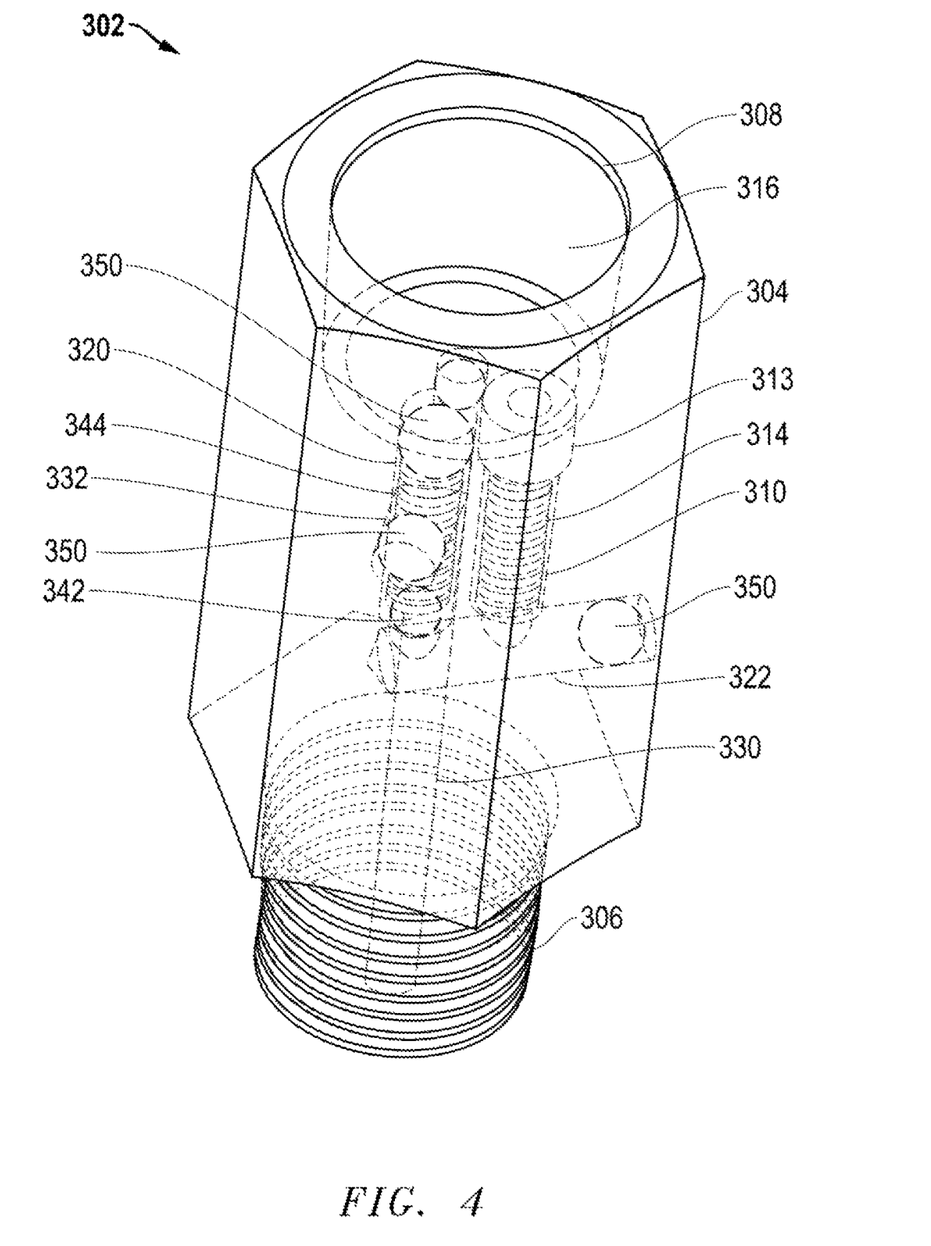
FIG. 4 shows the embodiment of FIG. 3 from a different angle.
Figure 5:
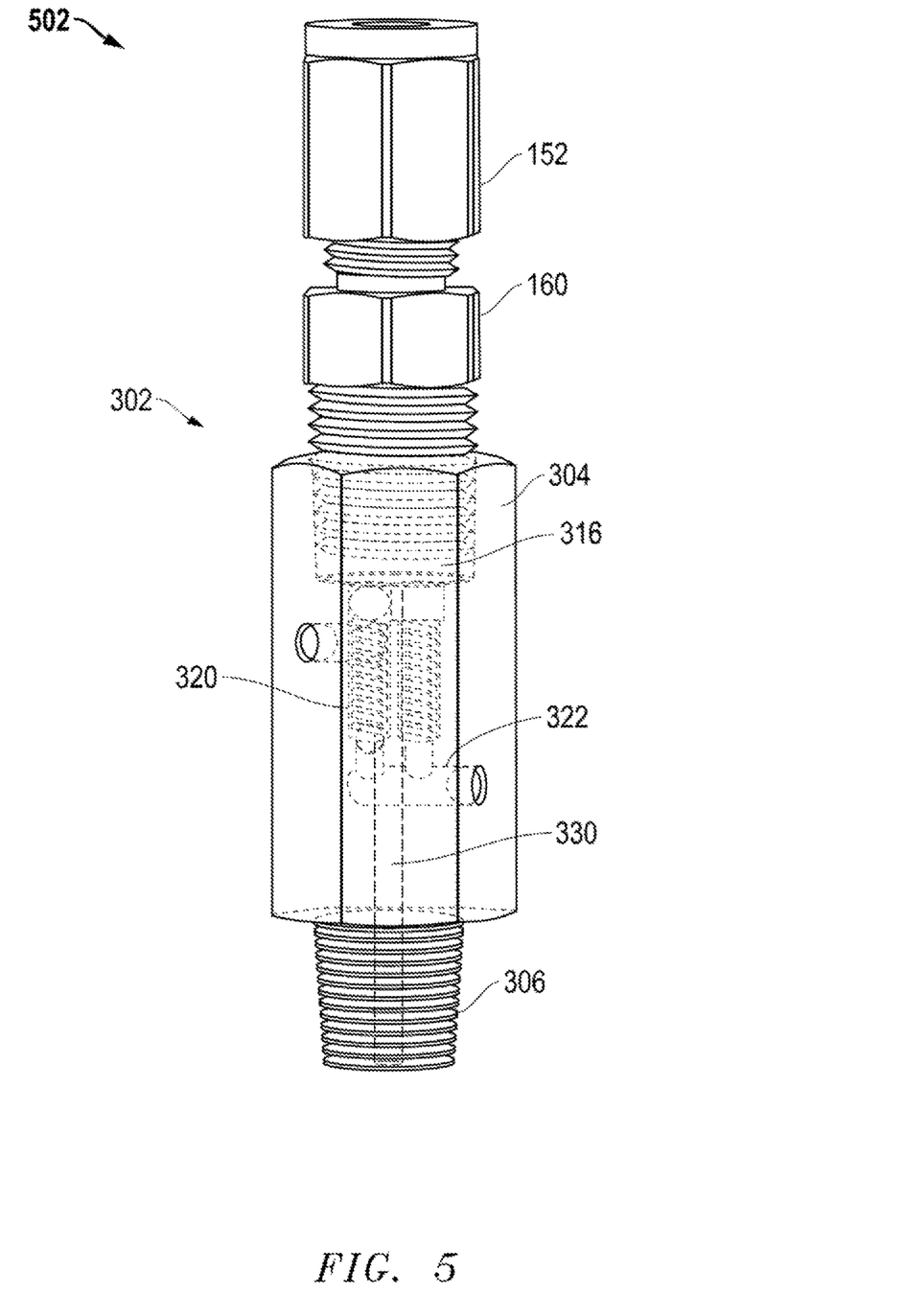
FIG. 5 shows the embodiment of FIG. 3 from yet a different angle.
Figure 6:
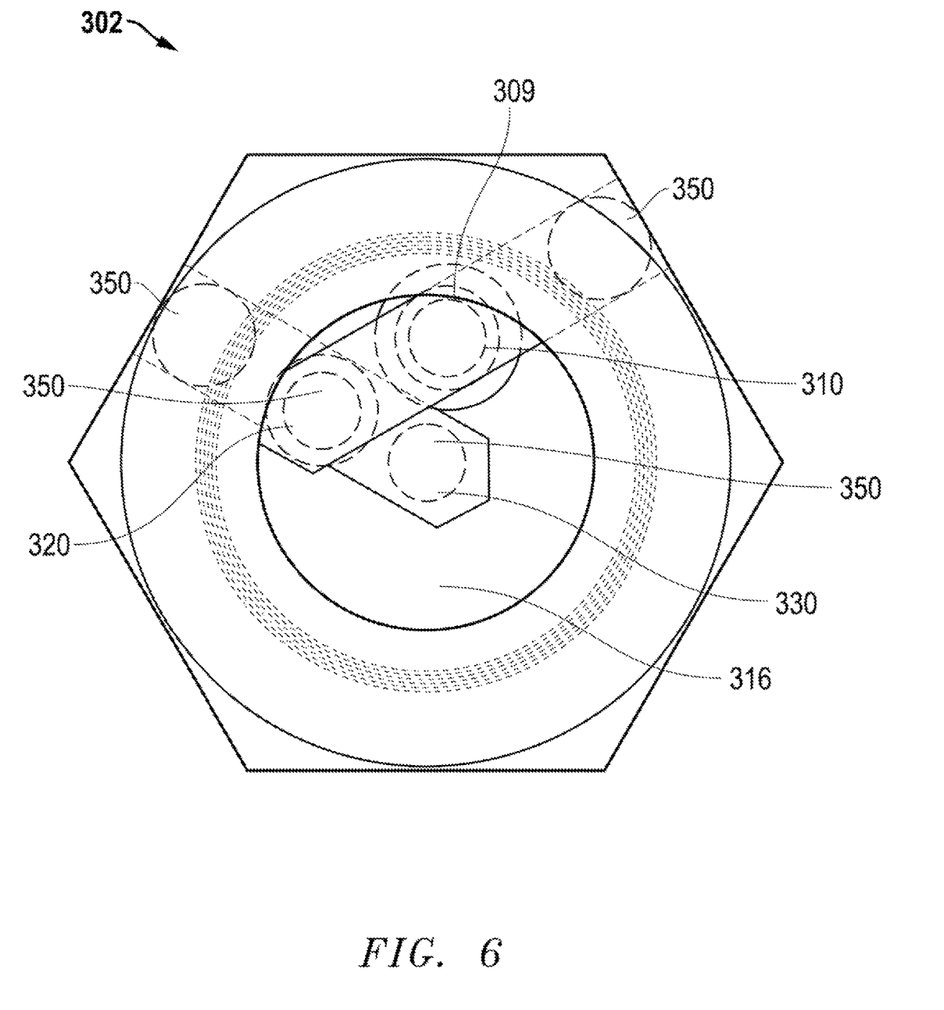
FIG. 6 is a top view of the embodiment of FIG. 3.

FIG. 4 shows the check valve 302 of FIG. 3 from a different perspective, with the housing shown as transparent to reveal the components inside the valve. FIG. 5 shows a check valve assembly 502 that includes a check valve 302, adapter assembly 150 and tube fitting 153. FIG. 6 shows a top view of check valve 302. Form the top view, looking into cavity 308, ball 309 is visible in seat 313 at the top of inlet passage 310, and plugs 350 block intermediate passage 320 and outlet passage 330.

Figure 7:
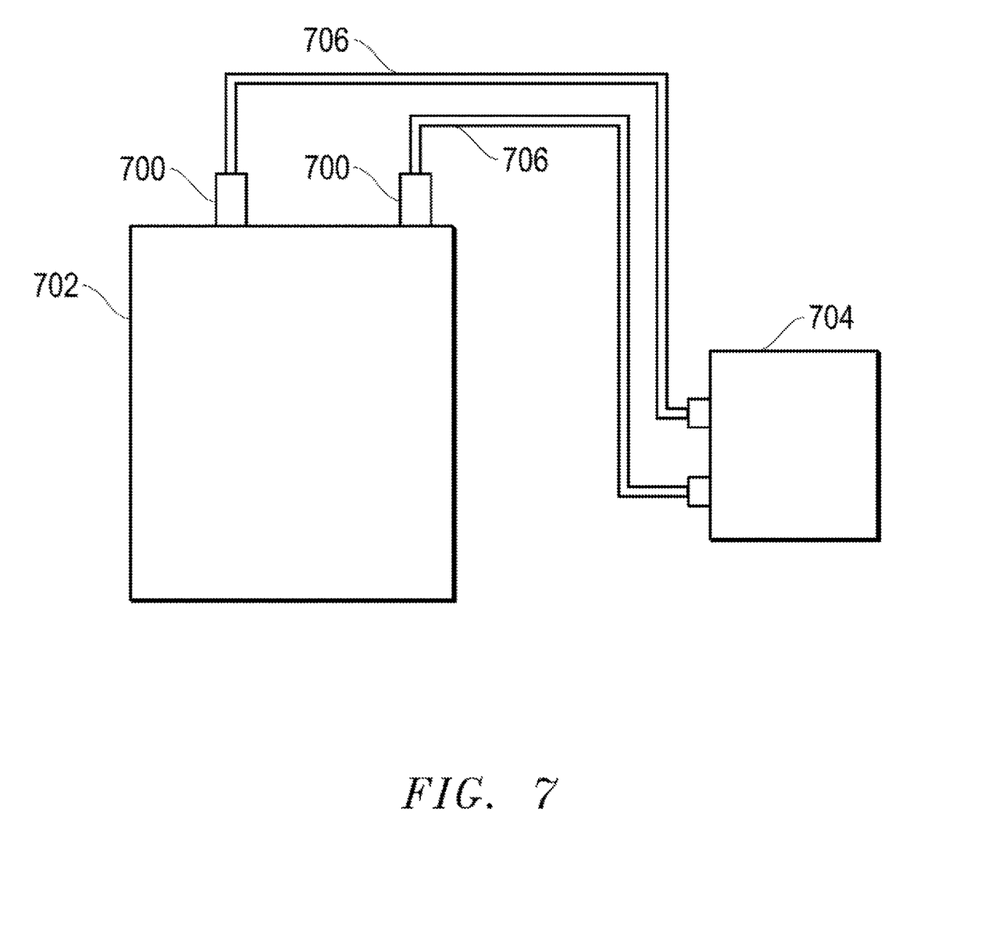
FIG. 7 shows a lubrication system for a natural gas compressor.

FIG. 7 shows two check valves 700 on a natural gas compressor 702. A divider block 704 supplies lubricant under pressure through a lubrication tubes 706 to check valves 700, which pass the high pressure lubricant into the compressor, but do not allow gases and debris from the compressor to back flow into the lubrication system.

Figure 8:
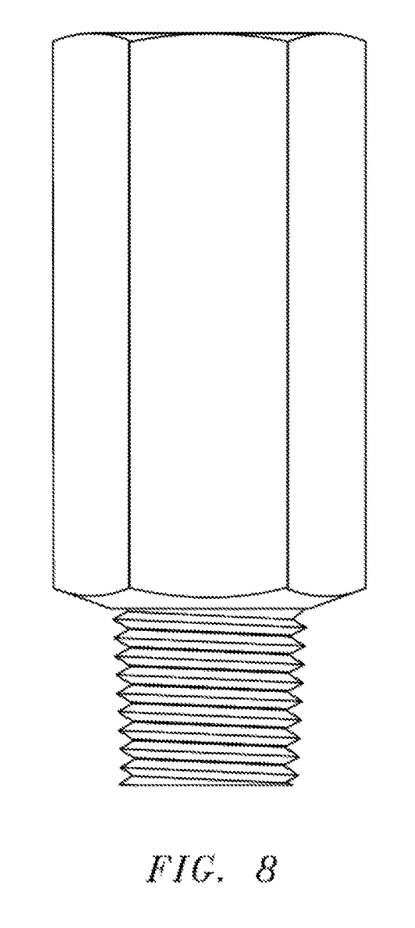
FIG. 8 shows a front view of the embodiment of FIG. 3.
Figure 9:
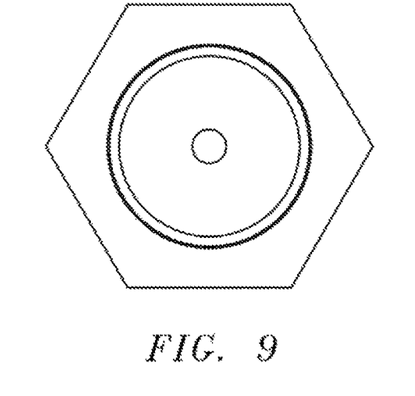
FIG. 9 shows a bottom view of the embodiment of FIG. 3.
Figure 10:
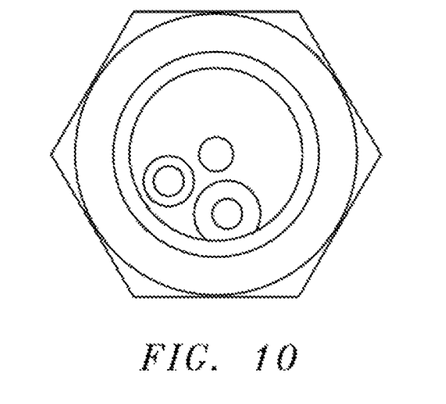
FIG. 10 shows a top view of the embodiment of FIG. 3.
Figure 11:
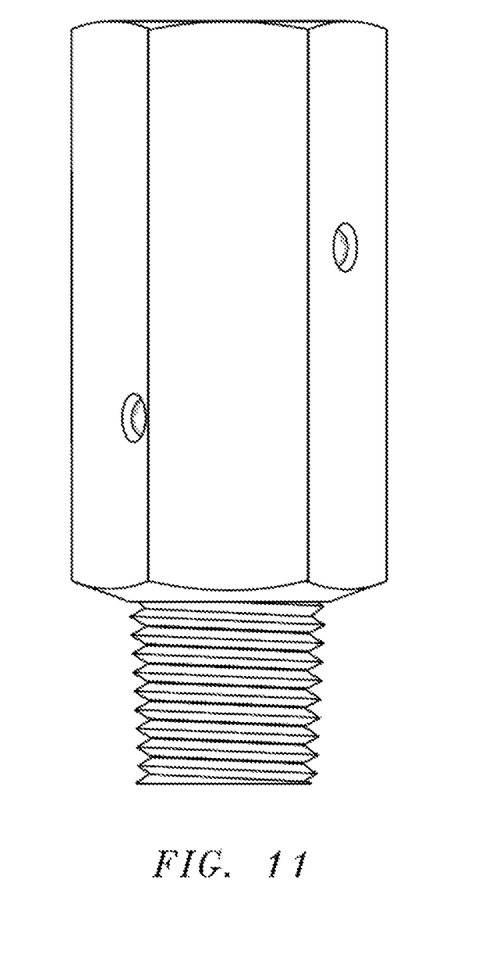
FIG. 11 shows a back view of the embodiment of FIG. 3.
Figure 12:
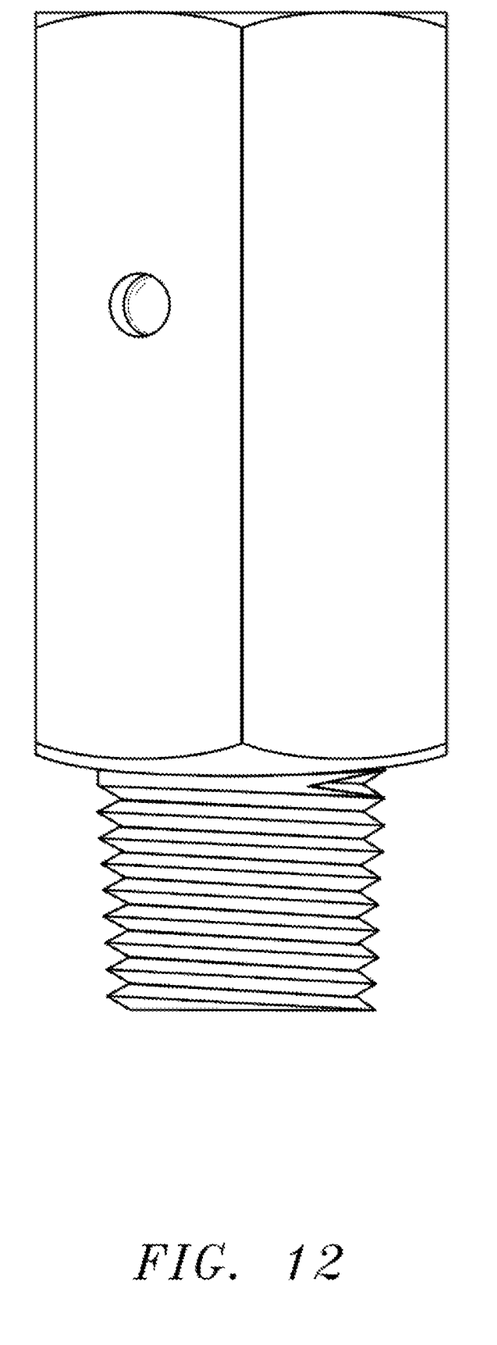
FIG. 12 shows a left side view of the embodiment of FIG. 3.
Figure 13:
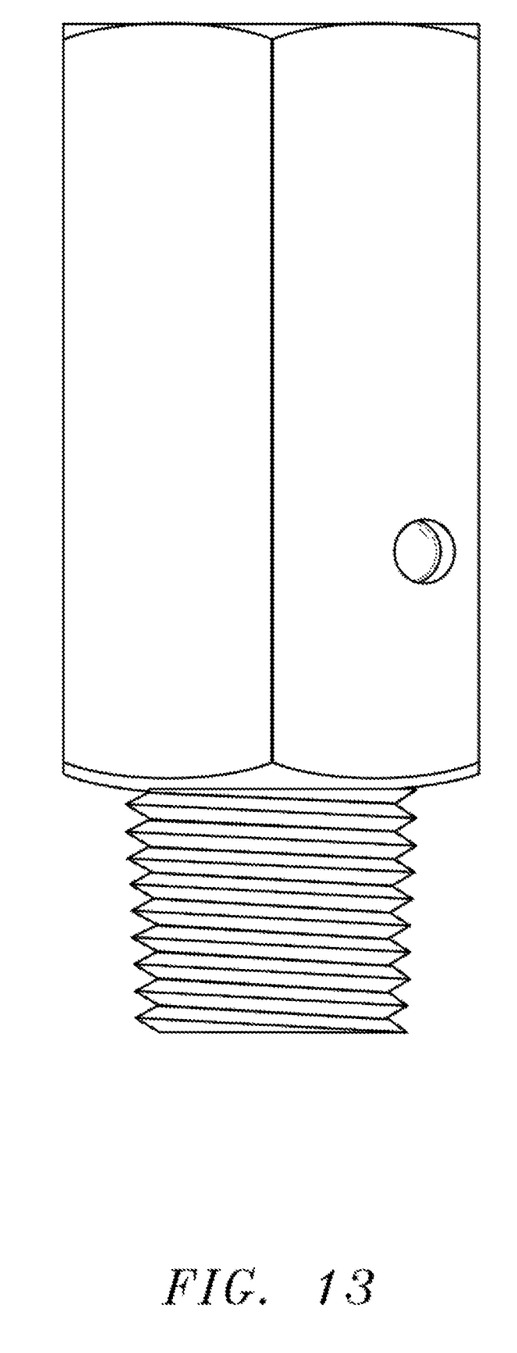
FIG. 13 shows a right side view of the embodiment of FIG. 3.

FIG. 8 shows a front view of check valve 302. FIG. 9 shows a bottom view of check valve 302. FIG. 10 shows a top view of check valve 302. FIG. 11 shows a back view of check valve 302. FIG. 12 shows a left side view of check valve 302. FIG. 13 shows a right side view of check valve 302.

Figure 14:
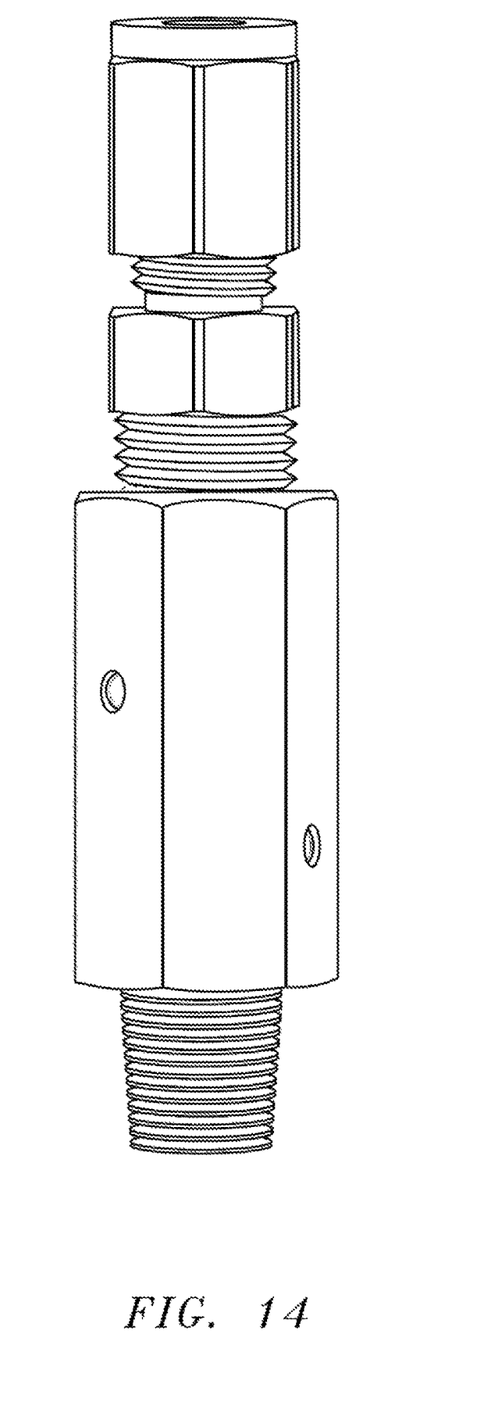
FIG. 14 shows a back view of the embodiment of FIG. 3 with adaptor fittings attached.

FIG. 14 shows a back view of the embodiment of FIG. 3 with adaptor fittings attached. The adapter fitting are shown in FIG. 1

In some embodiments, the axes of the threads on both ends of the valve are parallel, allowing the operator to have two NPT connections in parallel with each other, eliminating the requirement of a particular orientation of the valve that can cause over torquing by turning the screw in the valve further to obtain the correct orientation. Some embodiments provide an in-line top entry to install a tube connector in a vertical position. This allows for torquing the device correctly due to having two NPT connections in a straight line. This eliminates the problem with over torquing because there is no need to ensure the 90-degree alignment with the system tubing.

Some embodiments eliminate the need for providing a separate check valve protector, since all components of a check valve and protector have been engineered to be incorporated internally.

Embodiments provide an oil reservoir above the internal components which protects the sealing surfaces from hot oil or gas.

Embodiments can ultimately eliminate the need to shut down a compressor to change a failed check valve because the check valve will literally last indefinitely. The cost to shut down a compressor to change a failed check valve can amount to tens of thousands of dollars because when the compressor is shut down all production of gas is halted.

By reducing compressor down time, embodiments reduce pollution because when the compressor is shut down the gas that was being compressed must be flared to the atmosphere which pollutes the earth's atmosphere.

Reducing the quantity of gas that is flared when it is shut down also reduces fines imposed for flaring.

The in-line design enables embodiments to be installed on any compressor or in any place a check valve is needed to prevent backflow of lubricant into a lubricating system.

While the embodiments described above are adapted for use in a natural gas compressor, the invention is not limited to any specific application. A preferred check valve used in a natural gas compressor lubrication system can be used in systems at pressures of 10,000 psi and at high temperatures, and can withstand the chemical environment. While the Figures show the use of ball valves inside the check valve, other types of valve, such as poppet valves can also be used. Embodiments could use any type of internal valve besides those mentioned above, for example, diaphragm valves, swing check valves, or disk valve.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A check valve for connecting to equipment supplied with a liquid, comprising:
   a valve body extending along an axis;
   an inlet passage within the valve body having an inlet cavity for entry of liquid into the valve;
   an inlet valve to allow fluid passage from the inlet cavity to the inlet passage;
   an outlet passage within the valve body having an outlet for exit of liquid from the valve;
   an intermediate passage in communication with the inlet passage through a connecting passage and the outlet passage, the inlet valve, inlet passage, outlet passage, and intermediate passages being parallel to the valve body axis;
   an internal valve within the valve body located between the inlet valve and the outlet passage and parallel to the valve body axis, the internal valve allowing the flow of liquid through the valve body under pressure from the inlet passage in a first direction, through the intermediate passage in a second direction opposite to the first direction, and through the outlet passage in the first direction but preventing the backflow of material from the outlet through the valve body; and
   wherein liquid is trapped within the inlet passage, the connecting passage, and the intermediate passage when pressure required to open the inlet valve and the internal valves is reduced to stop liquid flow.

2. The check valve of claim 1 in which the internal valve includes a spring.

3. The check valve of claim 1 in which the inlet passage and a portion of the outlet passage at which liquid leaves the valve body are parallel.

4. The check valve of claim 1 in which the valve body includes a first threaded end through which liquid passes out of the valve body and into the equipment and a second threaded end through which liquid enters the valve body, the first threaded end having a first longitudinal thread axis and the second threaded end having a second longitudinal thread axis, the first longitudinal thread axis and the second longitudinal thread axis being coaxial.

5. The check valve of claim 1 in which the outlet passage is centered in the valve body.

6. The check valve of claim 5 further comprising at least one spring in at least one of the inlet passage, the intermediate passage, or the outlet passage.

7. The check valve of claim 5 further comprising at least two springs, one spring in at least two of the inlet passage, the intermediate passage, or the outlet passage.

8. The check valve of claim 5 in which liquid is trapped between the outlet passage and the internal valve.

9. The check valve of claim 1 in which the valve body includes a first threaded end through which liquid passes out of the valve body and into the equipment and a second threaded end through which liquid enters the valve body, the first threaded end having a first longitudinal thread axis and the second threaded end having a second longitudinal thread axis, the first longitudinal thread axis and the second longitudinal thread axis being parallel to, and offset from, each other.

10. The check valve of claim 1 in which the internal valve traps liquid in a portion of the intermediate passage above the internal valve when the internal valve is closed.

11. A check valve assembly, comprising:
the check valve according to claim 1 further comprising pipe threads associated with the inlet cavity;
a first adapter screwed into the pipe threads for connecting to a source of fluid.

12. The check valve assembly of claim 1 further comprising a second adapter, the second adapter screwing into second pipe threads in the first adapter, an opposite end of the second adapter being adapted to connect to tubing supplying the liquid.

13. A lubrication system for a natural gas compressor, comprising:
a divider block for periodically providing lubricant;
a check valve in accordance with claim 1, the check valve receiving lubricant from the divider block and supplying lubricant to the natural gas compressor.

14. A method of making a check valve device, comprising:
providing an elongated block of material extending along a central axis;
providing threads on the opposite ends of the elongated material;
providing multiple internal passages within the elongated material forming an inlet passage having in inlet valve, an outlet passage, and an intermediate passage in communication with the inlet and outlet passages, each passage extending along an axis parallel to the central axis so that fluid flows in one direction from the inlet passage and in an opposite direction through the intermediate passage to the outlet passage, the internal passages configured to trap fluid within the elongated material; and
providing at least one internal valve located between the inlet valve and the outlet passage within at least one of the multiple internal passages, the trapped fluid protecting the inlet valve and the internal valve from material entering the valve from one end of the elongated material.

\* \* \* \* \*